(12) United States Patent
Anvin

(10) Patent No.: US 7,039,792 B1
(45) Date of Patent: May 2, 2006

(54) METHOD AND SYSTEM FOR IMPLEMENTING A FLOATING POINT COMPARE USING RECORDED FLAGS

(75) Inventor: H. Peter Anvin, San Jose, CA (US)

(73) Assignee: Transmeta Corporation, Santa Clara, CA (US)

( * ) Notice: Subject to any disclaimer, the term of this patent is extended or adjusted under 35 U.S.C. 154(b) by 390 days.

(21) Appl. No.: 10/607,480

(22) Filed: Jun. 25, 2003

(51) Int. Cl.
  *G06F 9/305* (2006.01)
(52) U.S. Cl. .................................... 712/222
(58) Field of Classification Search ............... 712/222
  See application file for complete search history.

(56) References Cited

U.S. PATENT DOCUMENTS

| | | | |
|---|---|---|---|
| 6,247,117 B1 * | 6/2001 | Juffa | 712/222 |
| 6,393,555 B1 * | 5/2002 | Meier et al. | 712/222 |
| 6,934,832 B1 * | 8/2005 | Van Dyke et al. | 712/244 |

* cited by examiner

*Primary Examiner*—William M. Treat

(57) ABSTRACT

A method and system for implementing a floating point compare operation in an x86 compatible processor. The method includes the step of comparing a first bit pattern and a second bit pattern using a floating point unit of an x86 compatible processor. The EFLAGS register is set in accordance with a result of the comparison. A sign flag and an overflow flag of the EFLAGS register are encoded with information derived from the result of the comparison.

15 Claims, 4 Drawing Sheets

METHOD AND SYSTEM FOR IMPLEMENTING A FLOATING POINT COMPARE USING RECORDED FLAGS

TECHNICAL FIELD

The present invention relates generally to digital microprocessors. More specifically, the present invention pertains to efficiently implementing hardware support for the floating point math operations in a digital microprocessor.

BACKGROUND ART

Floating point math is used in computer system applications for calculating a large range of numbers quickly. Generally, floating point math refers to a method for storing and calculating numbers in which the decimal points do not line up as in fixed point numbers. The significant digits are stored as a unit called the "mantissa," and the location of the radix point (e.g., decimal point in base-10) is stored in a separate unit called the "exponent." Floating point operations can be implemented in hardware (e.g., a floating point unit of a microprocessor), or they can be done in software. In large systems, they can also be performed in a separate floating point processor that is connected to the main processor via a bus. IEEE Standard 754 floating point (also known as IEC 559, IEEE 854 or IEC 60559) is the most common representation for real numbers on computers, including x86 based PC's, Macintoshes, and most Unix platforms. With respect to x86 and/or x87 based computer systems, the implementation of IEEE 754 floating point math is inefficient. This is problematic since many different types of computer system applications require high-performance floating point calculations. What is required is an efficient implementation of IEEE 754 floating point math on x86 based computer systems.

DISCLOSURE OF THE INVENTION

Embodiments of the present invention provide a method and system for implementing a floating point compare instruction using recorded flags.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE EMBODIMENTS

Figure 1:
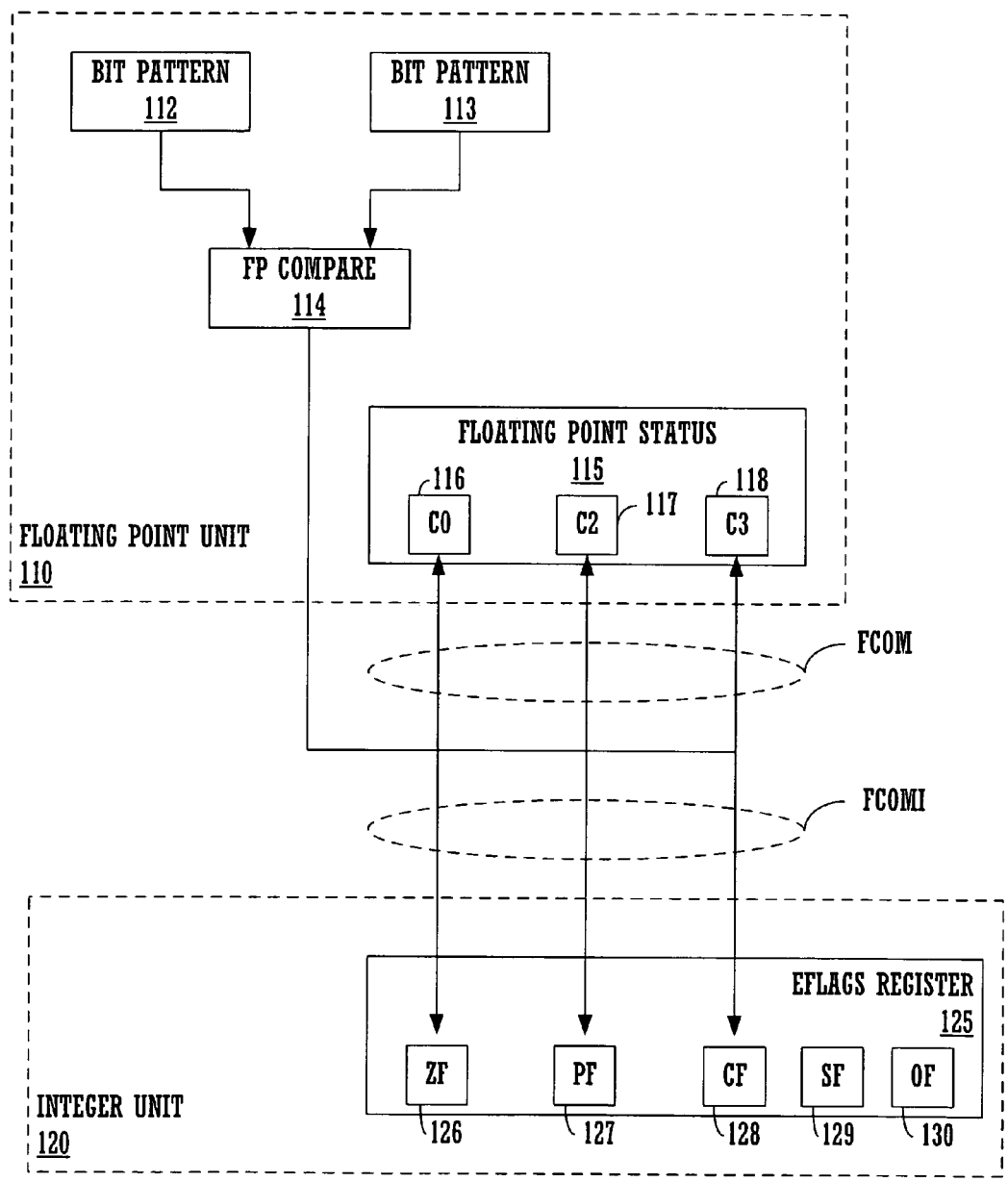
FIG. 1 shows a flow diagram depicting the operation of two floating point compare instructions in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Embodiments of the present invention implement a method and system for providing hardware support for floating point compare operations in an x86 compatible processor. The method includes the step of comparing a first bit pattern and a second bit pattern (where each pattern represents a floating point number or other entity) using a floating point unit of an x86 compatible processor. The EFLAGS register is set in accordance with a result of the comparison (e.g., as result of the FCOMI instruction). A sign flag (SF) and an overflow flag (OF) of the EFLAGS register are encoded with information derived from the result of the comparison. Embodiments of the present invention and their benefits are further described below.

Notation and Nomenclature

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "storing" or "accessing" or "recognizing" or "retrieving" or "translating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

EMBODIMENTS OF THE PRESENT INVENTION

FIG. 1 shows a flow diagram depicting the operation of two floating point compare instructions in accordance with one embodiment of the present invention. As depicted in FIG. 1, block 110 shows the operation of a floating point compare instruction as implemented by a floating point unit of an x86 compatible microprocessor. Block 120 depicts the operation of a floating point compare instruction as implemented by an integer unit of the x86 compatible microprocessor.

As shown in block 110, a floating point compare (FCOM) of two input bit patterns 112–113 is executed by a compare unit 114. The result of the comparison is stored into a floating point status register 115. As known by those skilled in the art, in an x86 compatible microprocessor, the floating point status register 115 includes three flags 116–118, which are referred to as C0, C2, and C3, as shown. As known by those skilled in the art, the three flags 116–118 are used to encode the result of the comparison performed by a floating point compare unit 114.

Generally speaking, in an x86/x87 compatible processor, the three flags 116–118 are used to encode four possible conditions: less than ("<"), equal ("="), greater than (">"), and unordered ("U") that are the result of the FCOM instruction. In accordance with IEEE 754, "U" results where at least one of the operands of the compare (e.g., bit pattern 112 or bit pattern 113) is a "NaN" (Not-a-Number) as defined by the specification (an invalid number, usually representing an error condition). When a floating point compare instruction like FCOM is executed, including the variant instructions FCOMP, FCOMP, FCOMPP, FUCOM, FUCOMP or FUCOMPP ("FCOM instructions"), the flags 116–118 are set to indicate the result.

In more recent processors, instructions such as FCOMI, FCOMIP, FUCOMI, FUCOMIP, COMISD, COMISS, UCOMISD and UCOMISS ("FCOMI instructions") can be used to execute a floating point compare instruction and to place the result into the integer unit of the processor. As shown in block 120, when an FCOMI instruction is performed, the result of the floating point compare performed by the unit 114 is used to set flags in the integer unit of the processor. This is depicted in FIG. 1 as the results of the floating point compare unit 114 being transferred to the floating point status register 115 and to the EFLAGS register 125. The status that corresponds to the flags C0, C2, and C3 map directly to the flags ZF, PF, and CF of the EFLAGS register 125. With the standard FCOMI instructions, the flags SF and OF are not used and set to either zero or an undefined value.

Referring still to FIG. 1, embodiments of the present invention provide a solution to the problematic execution of floating point compare instructions in x86 compatible processors. The basic problem involves the fact that the IEEE 754 floating point comparison instructions are implemented poorly on the Intel architecture. The standard Intel architecture is a holdover from the Intel x87 line of math coprocessors, later incorporated into the main processor as floating point units.

As known by those skilled in the art, the standard Intel architecture codes the outputs of a floating point instruction, specifically the instruction "floating point compare" (FCOM) and its related instructions using three bits 116–118. The bits are referred to as flags "C0", "C2", and "C3" as described above. The two input bit patterns 112–113 (which may or may not be valid numbers) are compared using floating point compare instruction that executes in accordance with the IEEE 754 standard. The result of the compare is encoded using the flags 116–118. These flags are made available to the rest the processor.

Block 120 shows an FCOMI instruction which places the results of the comparison (e.g., performed by the unit 114) into the EFLAGS register 125. The FCOMI instructions can be very useful in that the result of the instruction is made available to the hardware of the integer unit through the EFLAGS register 125. The integer unit hardware includes processor hardware that performs branch instructions, conditional move instructions, value-setting instructions (e.g. the x86 SETcc series of instructions), or other predicated instructions. These types of instructions are used by software code to act upon a condition (an essential requirement for any nontrivial piece of software code). Branch instructions directly affect the control flow of a program (e.g., if one floating point number is greater than or equal to another floating point number, continue what you are doing, else jump to this address); conditional move, SETcc, or other predicated instructions are used to avoid these relatively expensive control flow changes. Since these types of instructions tend to occur frequently, it is very important that the integer unit hardware that implements these instructions be highly optimized for rapid execution.

Unfortunately, as known by those skilled in the art, instructions which involve the parity flag (PF) in their expression are particularly problematic. There is no efficient branch programming methodology that can make use of the parity flag PF 127 in combination with any of the other flags (e.g., some combination of flag 127 with flag 126 or 128). In the prior art, any branch expression, conditional move, set operation or other predicated operation which includes the flag PF in conjunction with any other flag requires a larger amount of code to utilize in comparison to what would otherwise be desirable.

Embodiments of the present invention solve this problem by taking the results (e.g., of FCOMI) that are combinations that include PF and encoding them onto the other status bits 129 and 130 (e.g., SF and OF) which are currently unused in the FCOMI instruction. This allows efficient branches, conditional moves, set operations, and other predicated operations since result combinations that include PF in their expression are now reflected in the new SF and OF (e.g., SF' and OF'). The process of encoding SF and OF in accordance with the present invention is diagrammed in FIG. 2 below.

Figure 2:
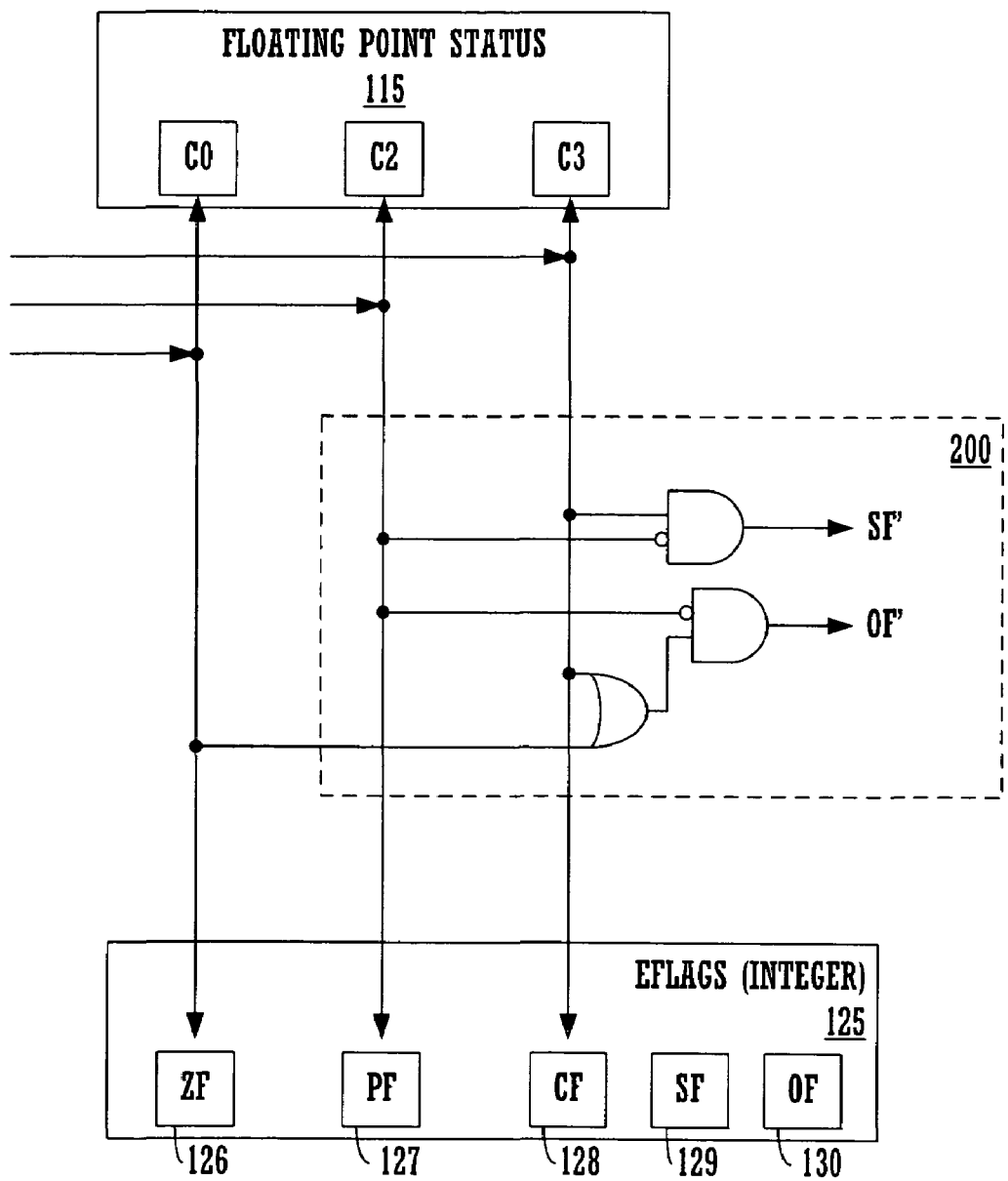
FIG. 2 shows a diagram of the encoding logic required to encode the flags SF and OF to reflect the results of a floating point compare instruction in accordance with one embodiment of the present invention.

FIG. 2 shows a diagram of the encoding logic 200 required to encode the flags SF and OF to reflect the results of a floating point compare instruction in accordance with one embodiment of the present invention. As depicted in FIG. 2, the encoding logic 200 comprises combinational logic (e.g., logic gates) that derive the flags SF' and OF' as shown.

Thus, the new flag SF' and OF' are computed as:

$$SF' := (\sim PF) \ \& \ CF$$

$$OF' := (\sim PF) \ \& \ (CF \mid ZF)$$

where & represents boolean AND, | represents boolean inclusive OR, and ~ represents boolean NOT. Now all fourteen nontrivial combinations of IEEE comparison operations, including the six normal comparison operations defined by among others the "C" computer language (ISO/IEC 9899), map directly onto standard x86 conditions that can be efficiently used by the integer hardware, while still being fully compliant with the IEEE 754 specification.

In one embodiment, the new flags SF' and OF' are recorded directly into the flags 129 and 130 (e.g., the SF flag and the OF flag) of the EFLAGS register 125. This makes the values immediately available to the hardware of the integer unit (e.g., the branch hardware, etc.).

Figure 3:
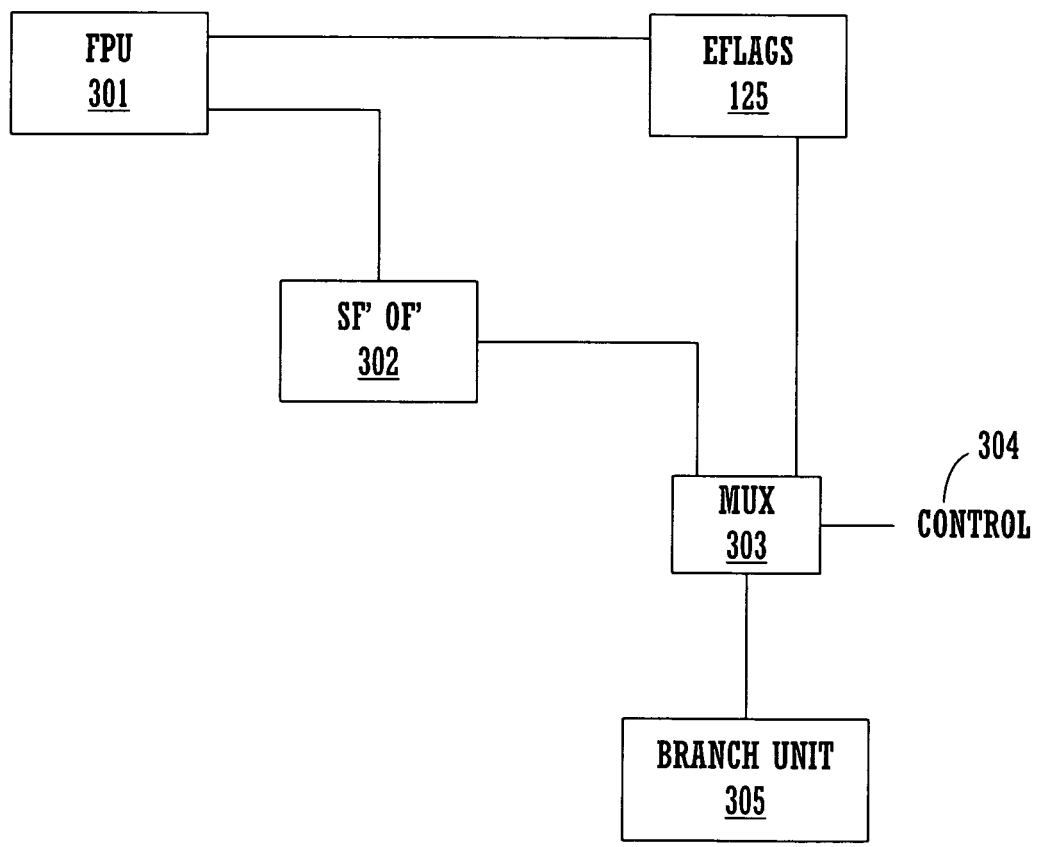
FIG. 3 shows a diagram of an exemplary processor architecture in accordance with one embodiment of the present invention.

FIG. 3 shows a diagram of an exemplary processor architecture 300 in accordance with one embodiment of the present invention. As depicted in FIG. 3, a floating point unit (FPU) 301 is coupled to provide the results of a floating point compare instruction (e.g., FCOMI) to the EFLAGS register 125. In the present embodiment, the FPU 301 includes logic (e.g., logic 200 shown in FIG. 2) for computing SF' and OF' as described above. These results are provided to a register 302. A multiplexer 303 can selectively couple the standard output of the EFLAGS register 125 to the branch unit 305, or the flags of the register 125 plus the new values SF' and OF' (replacing the old values SF and OF) to the branch unit 305. The selection is made in accordance with a control input 304. This allows the new capability provided by the inclusion of the new values SF' and OF' to be hidden away from other circuitry of the processor, for example, on those occasions where strict legacy x86 compatibility must be assured.

Computer System Platform

Figure 4:
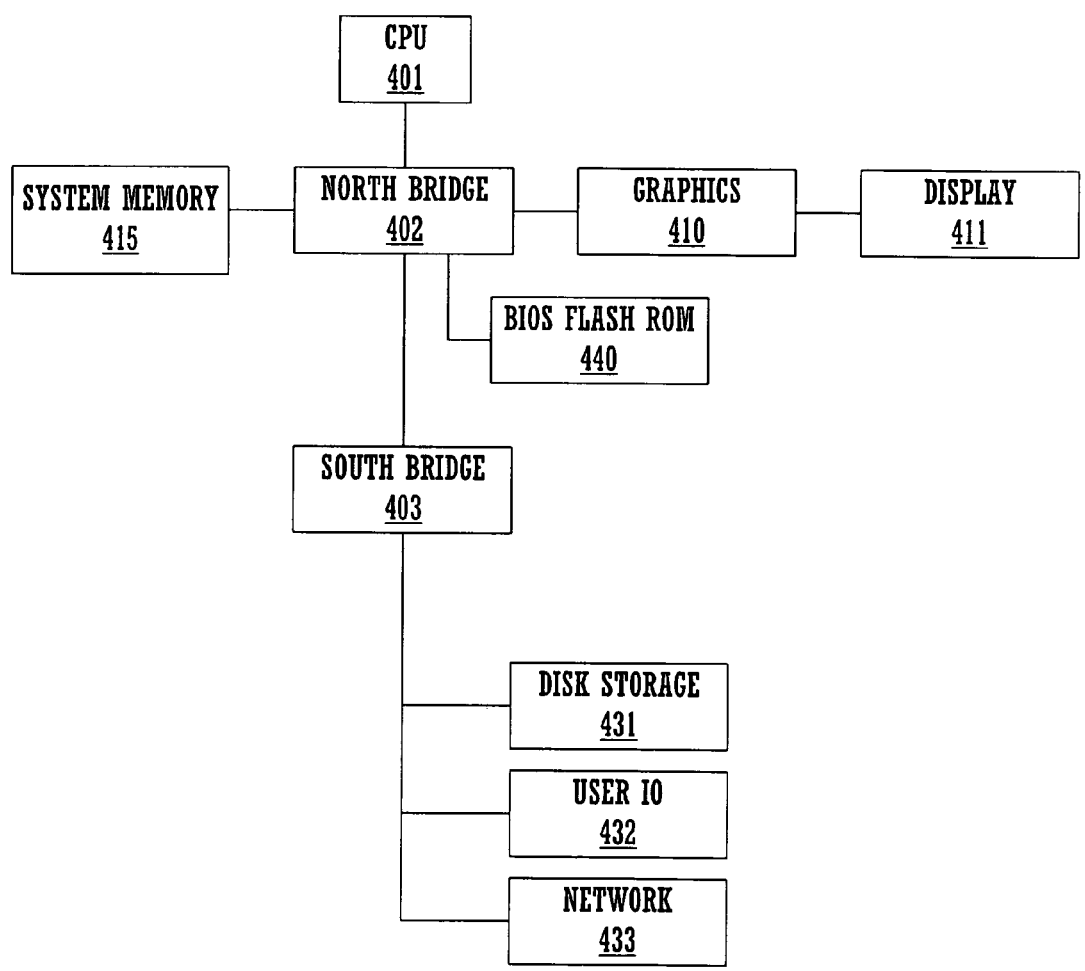
FIG. 4 shows a diagram of a computer system in accordance with one embodiment of the present invention.

With reference now to FIG. 4, a computer system 400 in accordance with one embodiment of the present invention is shown. Computer system 400 shows the general components of a computer system in accordance with one embodiment of the present invention that provides the execution platform for implementing certain software-based functionality of the present invention. As described above, certain processes and steps of the present invention are realized, in one embodiment, as a series of instructions (e.g., software program) that reside within computer readable memory units of a computer system (e.g., system 400) and are executed by the CPU 401 of system 400. When executed, the instructions cause the system 400 to implement the functionality of the present invention as described above.

In general, system 400 comprises at least one CPU 401 coupled to a North bridge 402 and a South bridge 403. The North bridge 402 provides access to system memory 415 and a graphics unit 410 that drives a display 411. The South bridge 403 provides access to a plurality of coupled peripheral devices 431 through 433 as shown. Computer system 400 also shows a BIOS ROM 440 that stores BIOS initialization software.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of implementing a floating point compare operation in an x86 compatible processor, comprising:
    comparing a first bit pattern and a second bit pattern using a floating point unit of an x86 compatible processor;
    setting an EFLAGS register in accordance with a result of the comparison; and
    encoding a sign flag and an overflow flag of the EFLAGS register with information derived from the result of the comparison.

2. The method of claim 1 wherein the first bit pattern and the second bit pattern are inputs for a floating point compare instruction.

3. The method of claim 1 wherein the floating point unit of the processor is configured to perform floating point operations in accordance with IEEE 754.

4. The method of claim 1 further comprising:
    using combinational logic to encode the sign flag and the overflow flag based on the result of the comparison.

5. The method of claim 1 further comprising:
    using the sign flag and the overflow flag encoded with information derived from the result of the comparison to implement a branch instruction, a conditional move instruction, a set operation, or a predicated operation.

6. A system for implementing a floating point compare operation in an x86 compatible processor, comprising:
    a floating point unit configured to compare a first bit pattern and a second bit pattern;
    an EFLAGS register, the EFLAGS register having a plurality of flags to receive a result of the comparison; and
    encoding logic coupled to the EFLAGS register and the floating point unit, the encoding logic for encoding a sign flag and an overflow flag of the EFLAGS register with information derived from the result of the comparison.

7. The system of claim 6 wherein the first bit pattern and the second bit pattern are inputs for a floating point compare instruction.

8. The system of claim 6 wherein the floating point unit of the processor is configured to perform floating point operations in accordance with IEEE 754.

9. The system of claim 6 further comprising:
    control logic for selectively enabling the encoding logic to encode the sign flag and the overflow flag with information derived from the result of the comparison.

10. The system of claim 6 wherein the sign flag and the overflow flag are encoded in accordance with the result of the comparison to implement a branch instruction, a conditional move instruction, a set operation, or a predicated operation.

11. A system for implementing an efficient floating point compare operation in an x86 compatible processor while ensuring x86 compatibility, comprising:
    a floating point unit configured to compare a first bit pattern and a second bit pattern;
    an EFLAGS register, the EFLAGS register having a plurality of flags to receive a result of the comparison;
    encoding logic coupled to the EFLAGS register and the floating point unit, the encoding logic for encoding a sign flag and an overflow flag of the EFLAGS register with information derived from the result of the comparison; and
    control logic for selectively disabling the encoding logic to encode the sign flag and the overflow flag with information derived from the result of the comparison to ensure x86 compatibility.

12. The system of claim 11 wherein the first bit pattern and the second bit pattern are inputs for a floating point compare instruction.

13. The system of claim 11 wherein the floating point unit of the processor is configured to perform floating point operations in accordance with IEEE 754.

14. The system of claim 11 wherein the control logic includes a multiplexer to selectively enable the encoding of the sign flag and the overflow flag in accordance with the result of the comparison.

15. The system of claim 11 wherein the sign flag and the overflow flag are encoded in accordance with the result of the comparison to implement a branch instruction, a conditional move instruction, a set operation, or a predicated operation.

* * * * *